United States Patent [19]

Cummins

[11] Patent Number: 5,516,272
[45] Date of Patent: May 14, 1996

[54] FLOW CONTROL APPARATUS FOR A DOUGH-HANDLING MACHINE

[75] Inventor: Donald L. Cummins, deceased, late of Mechanicsville, Va., by Marian G. Cummins, executor

[73] Assignee: Cummins Eagle, Inc., Ashland, Va.

[21] Appl. No.: 516,431

[22] Filed: Aug. 17, 1995

Related U.S. Application Data

[63] Continuation-in-part of Ser. No. 297,123, Aug. 29, 1994, Pat. No. 5,443,854.

[51] Int. Cl.⁶ ...................................................... A23P 1/00
[52] U.S. Cl. ...................... 425/145; 425/311; 425/382 R; 425/382.4
[58] Field of Search ................................. 425/145, 308, 425/382 R, 382.4, 311; 426/503, 516

[56] References Cited

U.S. PATENT DOCUMENTS

| | | | |
|---|---|---|---|
| 2,679,216 | 5/1954 | Grondona | 425/463 |
| 4,332,538 | 6/1982 | Campbell | 425/311 |
| 4,395,427 | 7/1983 | Fischer et al. | 426/231 |
| 4,424,236 | 1/1984 | Campbell | 426/231 |
| 4,449,908 | 5/1984 | Campbell | 425/204 |
| 4,517,212 | 5/1985 | Campbell | 426/503 |
| 4,948,611 | 8/1990 | Cummins | 426/503 |
| 4,960,601 | 10/1990 | Cummins | 426/504 |
| 5,046,940 | 9/1991 | Cummins | 425/311 |
| 5,350,290 | 9/1994 | Honings | 425/311 |

*Primary Examiner*—George Yeung
*Attorney, Agent, or Firm*—Norman B. Rainer

[57] ABSTRACT

Apparatus for controlling the flow of dough in a machine for advancing bakery dough through a single manifold that feeds parallel conduits includes a stem disposed upon the center axis of each conduit and adjustment means for axially positioning the stem. A moveable abutment plug of streamlined shape is positioned upon the stem adjacent its lowermost extremity. A stationary abutment shoulder is disposed within the conduit above the moveable abutment plug, and is adapted to make close-fitting contact with the upper portion of the moveable abutment plug.

9 Claims, 2 Drawing Sheets

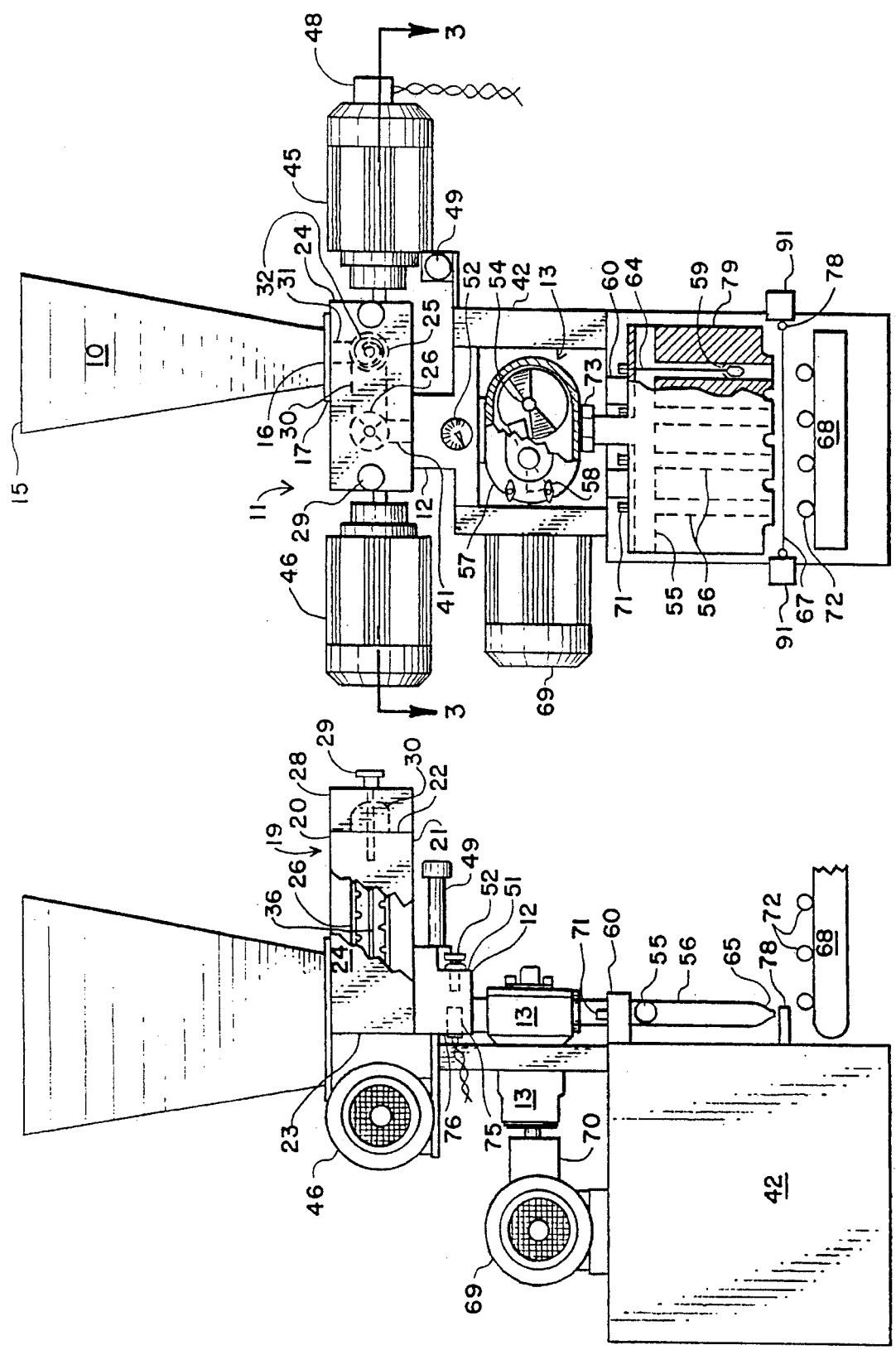

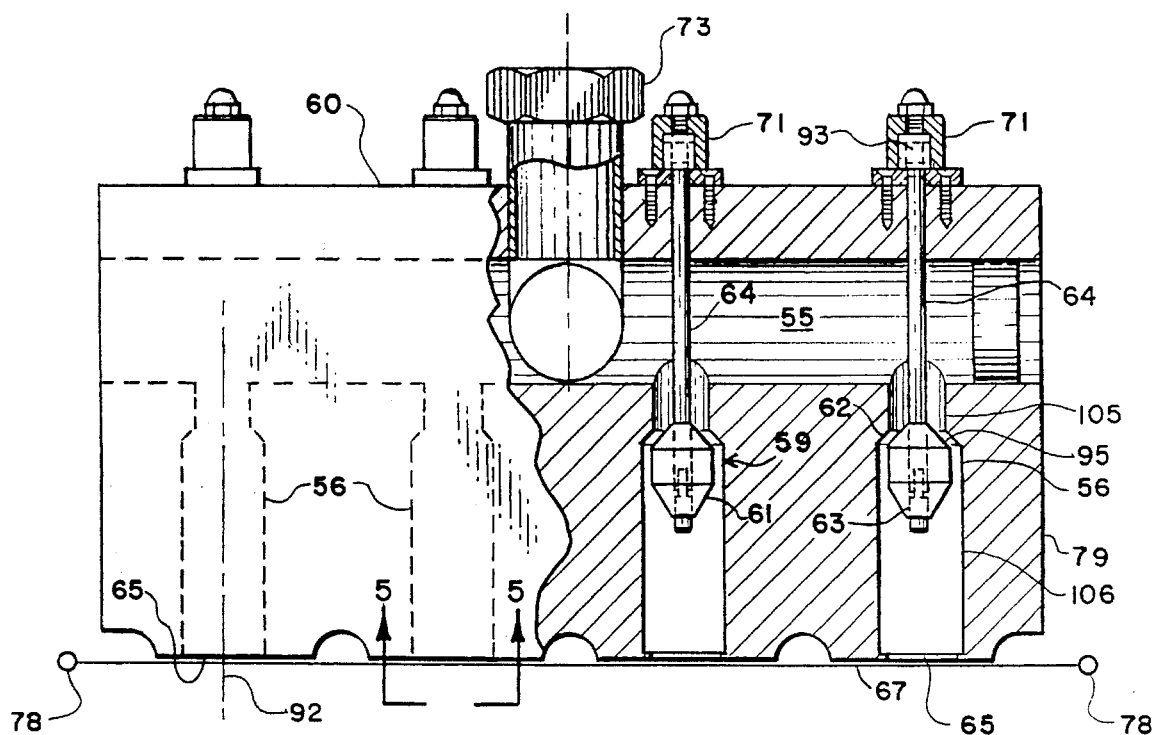
FIG. 3
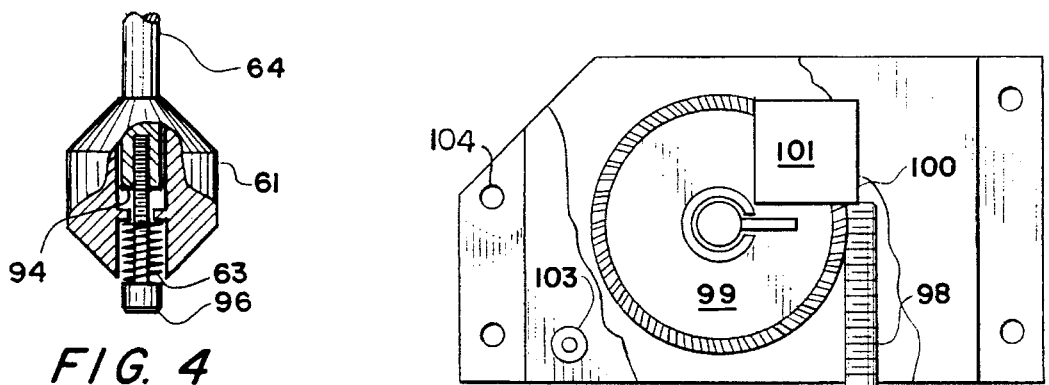
FIG. 4
FIG. 6
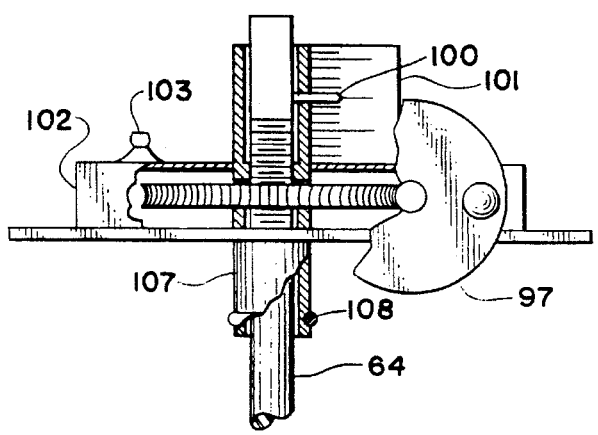
FIG. 5

FLOW CONTROL APPARATUS FOR A DOUGH-HANDLING MACHINE

RELATED APPLICATIONS

This application is a continuation-in-part of U.S. Pat. application Ser. No. 08/297,123, filed Aug. 29, 1994, now U.S. Pat. No. 5,443,854.

BACKGROUND OF THE INVENTION

1. Field of the Invention

This invention relates to the handling of dough for baking, and more particularly concerns a method and apparatus for dispensing successive pieces of dough of constant weight.

2. Description of the Prior Art

Methods and apparatus for advancing, homogenizing and dividing dough into pieces of predetermined uniform weight for baking into bread loaves, buns, rolls and the like are disclosed in U.S. Pat. Nos. 4,960,601; 4,517,212; 4,449,908; 4,424,236; 4,332,538; 4,948,611; and 5,046,940. In general, such apparatus may include a hopper which receives dough, auger means for advancing the dough, metering means which control the advance of the dough, multiple nozzles which receive the metered dough, and cutting means which sever the continuously advancing dough into discrete pieces that fall onto an underlying moving belt. A homogenizing step is usually included, which may be accomplished by mixing means usually referred to as a "developer."

It is important that each dough piece be as equal in weight to each other as possible. The uniformity of weight not only produces products of uniform quality but facilitates the automated handling and packaging of the baked products. Also, the weight of the dough is the most expensive cost factor in manufacturing baked goods, and control of the weight tolerances can reduce the need for excess dough. The production of dough pieces of uniform weight is known as "scaling" in the trade. In general, less than 2% deviation in weight is sought relative to a target weight.

Although various types of metering means, such as rollers, pistons and positive displacement pumps have been employed to achieve improved scaling, inconsistencies are still experienced. One reason for the inconsistencies is that, whereas the metering means advances dough on a constant volume basis, gas-formation produced by the yeast content of the dough can produce non-uniform dough density. Because of the paste-like nature of the dough and the fact that its high moisture content is held in microscopically small rupturable pockets, any variation in pressure or dough flow pattern while advancing through the apparatus can lead to product degradation and scaling inconsistencies. Such factors are particularly evident in systems wherein a single metering means supplies dough to a manifold that supplies a number of parallel extrusion conduits, each terminating in an outlet nozzle.

Various expedients have earlier been explored to remediate flow rate inconsistencies experienced in parallel extrusion conduits that handle dough or other paste-like alimentary product. For example, U.S. Pat. No. 2,679,216 to Grondona discloses a multi-apertured die plate having threaded plugs adapted to adjustably occlude each aperture in order to minimize inter-aperture variations in the extrusion of macaroni paste, said variations being otherwise attributable to variations in the temperature, composition, frictional effects and flow path.

U.S. Pat. No. 4,395,427 to Fischer, et. al., concerns apparatus for advancing baking dough through a plurality of parallel nozzles to deposit shaped pieces of dough onto a moving conveyor leading toward a baking oven. Each nozzle is equipped with adjustable restrictor means for the purpose of equalizing the flow emergent from the several nozzles. The restrictor means is a sphincter-type mechanism involving a pair of opposed plates having facing edges adapted to approach each other in coplanar disposition. The shape of the facing edges is complimentary to the shape of the downstream extrusion orifice, the two shapes acting in concert to produce dough pieces of predetermined shape. Although possibly effective in achieving flow control, the use of slidably interactive plates creates upstream shoulders or stagnant zones wherein dough can accumulate and deteriorate. The plates also disturb the desired laminar flow of the dough. The narrow housings which accommodate the plates in their transverse motion relative to the flow of the dough are prone to fouling with accumulated dough, and are difficult to clean.

U.S. Pat. Nos. 4,948,611 and 5,046,940 to Cummins disclose apparatus for dividing bakery dough into a plurality of streams in separate horizontal conduits, and fine tuning the flow rate of the individual streams by adjustable restrictor means in the form of weir type diaphragm values. The diaphragm/weir combination requires that the flow of dough be asymmetrically diverted toward one side of the conduit and expanded laterally within the valve beyond the normal diameter of the conduit. Such disruption of the flow pattern of the dough, especially in a region close to the extrusion orifice, is detrimental to the quality of the extruded dough.

U.S. Pat. No. 5,350,290 to Honings discloses apparatus similar to the aforesaid Cummins patents but employs adjustable restrictor means in the form of a flexible conduit tube whose cross-sectional area is adjustably diminished by a squeeze bar. Although the Honings conduits are intended to maintain a laminar flow pattern, the action of the squeeze bar is to divert the flow pattern to one side of the conduit and broaden the width of the flow pattern in a manner similar to the aforesaid weir values. Neither the Honings or earlier teachings disclose means for achieving automatic control or buffering of dough flow.

It is accordingly an object of the present invention to provide apparatus for controlling the flow of dough through multiple parallel conduits fed by a single manifold.

It is a further object of this invention to provide apparatus as in the foregoing object which facilitates individualized adjustment of dough flow in each conduit.

It is another object of the present invention to provide apparatus of the aforesaid nature which preserves the laminar flow pattern of the dough through the conduit.

It is a still further object of this invention to provide apparatus of the aforesaid nature which preserves the symmetry of flow with respect to the center axis of the conduit.

It is yet another object of the present invention to provide apparatus of the aforesaid nature which is amenable to easy clean-out.

It is an additional object of this invention to provide apparatus of the aforesaid nature capable of automatically adjusting or buffering flow in a given conduit.

These objects and other objects and advantages of the invention will be apparent from the following description.

SUMMARY OF THE INVENTION

The above and other beneficial objects and advantages are accomplished in accordance with the present invention by apparatus for controlling the flow of dough through multiple parallel circular conduits fed by a single manifold, said apparatus comprising:

a) a stem disposed upon the center axis of each conduit and extending between an upstream proximal extremity associated with said manifold, and a downstream distal extremity, b) adjustment means for moving and securing said stem back and forth along said center axis, c) moveable abutment means disposed upon said stem adjacent said distal extremity, and d) stationary abutment means associated with said conduit upstream from said moveable abutment means and interactive therewith to form an annular constriction zone symmetrically disposed about said axis.

In a preferred embodiment, the conduits are vertically disposed, whereby the proximal extremities of said stems are upper extremities. The moveable abutment means may be slidably held upon said stem and biased against the flow direction by spring means interactive between the stem and moveable abutment means. In a further preferred embodiment, said conduits are comprised of a narrow upstream portion and a widened downstream portion which commences at said stationary abutment means.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a front view of an embodiment of a dough handling machine which may utilize the flow-controlling apparatus of the present invention, portions being broken away to reveal interior details.

FIG. 2 is a side view of the device of FIG. 1.

FIG. 3 is an enlarged fragmentary front view of the device of FIG. 1 showing an embodiment of the flow-controlling apparatus of the present invention.

FIG. 4 is an enlarged fragmentary sectional view of the flow-controlling apparatus shown in FIG. 3.

FIG. 5 is an enlarged fragmentary front view of an alternative embodiment of the flow-controlling apparatus of this invention, with portions broken away.

FIG. 6 is a top view of the embodiment of FIG. 5 with portions broken away to reveal interior details.

DESCRIPTION OF THE PREFERRED EMBODIMENT

Referring to FIGS. 1–3, an embodiment of a dough treating and dispensing machine wherein the flow-controlling apparatus of this invention is useful is shown comprised of hopper 10 disposed above advancing assembly 11 which is positioned above transition housing 12, metering pump 13 and extrusion conduits 56. An outer framework 42 provides support for said components.

Hopper 10 is of integral construction and tapered downwardly from upper extremity 15 to lowermost exit extremity 16. The hopper is contoured so as to have no corners where dough might accumulate as a stagnant zone. Exit extremity 16 is equipped with an outwardly directed flange 17 which permits sealed joinder to advancing assembly 11.

Advancing assembly 11 is comprised in part of receiver block 19 of generally rectangular configuration bounded by flat upper and lower surfaces 20 and 21, respectively, flat front and rear surfaces 22 and 23, respectively, and opposed side surfaces 24. First and second circular cylindrical bores 25 and 26, respectively, extend in parallel disposition between said front and rear surfaces.

A coupling block 28 is removably associated with front surface 22 by bolts 29, and has a passage 30 configured to establish continuity between the front extremities of both bores. A receiving port 31 penetrates upper surface 20 and establishes communication between exit extremity 16 of the hopper and first bore 25. An auger 32 is housed within said first bore, and a developer unit 36 is disposed within said second bore. An exit port 41 extends between the rear extremity of the second bore and lower surface 21. Receiver block 19 and coupling block 28 are preferably fabricated of engineering grade plastic having a low coefficient of surface friction. Suitable plastics include ultra-high molecular weight polyolefin, polyacetal, polyester, polyamide, and other moldable plastics having equivalent properties.

The auger and developer are driven by separate inverter-controlled variable speed motors 45 and 46, respectively. The entire advancing assembly may be constructed so that it may be pivoted upward about pivot rod 49 attached to frame 42 in parallel relationship to end surface 24 adjacent motor 45. Pivoted lifting of the advancing assembly facilitates cleaning and repair. Suitable means may be provided to secure the head assembly in its upper, cleaning position, and in its lowermost, functional position.

Transition housing 12 is disposed below lower surface 21 of said head assembly and configured to establish pressure-tight connection with exit port 41. The front surface 51 of housing 12 secures a pressure indicating device 52 which senses and indicates the dough hydraulic pressure dough within housing 12. An electronic pressure-sensing transducer 75 inserted through rear surface 76 of housing 12 produces an electrical control signal which is fed the inverter-controlled motors. By virtue of such arrangement, the speed of auger 32 is controlled. Because the route taken by the dough within the apparatus is pressure-tight, increased rotational speed of the auger produces increased pressure on the dough at transducer 75. In general, the configuration of the apparatus and its operating parameters are such that a constant pressure in the range of 15–28 psig is maintained at transducer 75.

A rotary positive displacement metering pump 13 is joined in a pressure-tight manner to the underside of housing 12, and receives dough therefrom. A suitable metering pump is Model 34 made by the Waukesha Company of Delavan, Wis. Said pump is driven by inverter controlled variable speed motor 69, acting through a right angle coupling 70, and is characterized in having two dual lobe intersecting rotors 54. A face plate 57 held by bolts 58 can be removed to facilitate removal of the rotors and cleaning of the interior of the pump.

A horizontally disposed distribution manifold 55 is positioned below said pump and coupled thereto in pressure-tight but removable joinder by means of threaded fitting 73.

A plurality of parallel extrusion conduits 56 of circular contour are downwardly directed from said manifold. Said distribution manifold and extrusion conduits 56 are exemplified as being fashioned from a single block 79 of engineering grade plastic. Each conduit is equipped with flow-controlling apparatus 59 of the present invention.

As best shown in FIGS. 3 and 4, said flow-controlling apparatus 59 is comprised of stem 64 disposed upon center axis 92 of said conduits. Stem 64 extends between a threaded proximal extremity 93 which penetrates block 79 above manifold 55, and an internally threaded downstream distal extremity 94.

Adjustment means in the form of threaded control knob 71 positioned atop block 79 permits said stem to be raised or lowered with respect to conduit 56.

Movable abutment means in the form of conically tapered plug 61 is slidably disposed upon said stem adjacent distal extremity 94. Stationary abutment means in the form of conically tapered shoulder 62 is positioned upstream of plug 61 within conduit 56. The upper portion of plug 61 interacts with shoulder 62 to form an annular constriction zone 95 symmetrically disposed about axis 92. The upstream and downstream portions of the plug are inwardly tapered toward the stem, thus presenting a streamlined configuration which preserves the laminar flow pattern of the dough. In a preferred embodiment, bolt 96 threadably engages distal extremity 94. Interposed between bolt 96 and stem 64 is a coil spring 63 adapted to urge plug 61 axially upon said stem.

By virtue of the aforesaid arrangement of components, upward movement of stem 64 constricts conduit 56, thereby diminishing the rate of flow of dough. Coil spring 63 serves to bias plug 61 upwardly or upstream, the amount of bias increasing as bolt 96 is tightened. Whereas the elevation of the stem is manually positionable while dough-handling equipment is running, plug 61 is automatically and continuously moved by spring 63, thereby providing a buffering or fine-tuning effect on the flow rate. The vertical position of the flow control apparatus eliminates the asymmetrically biasing gravity or sagging effect characteristic of horizontally positioned conduits.

The alternative embodiment of adjustment means shown in FIGS. 5 and 6 is comprised of a rotatable wheel 97 provided with a worm gear 98. Said worm gear is interactive with a flat gear 99 in threadable engagement with the proximal extremity of said stem. A pointer 100 and associated scale 101 indicates the precise height of the stem. A housing 102 encloses said gears, said housing being equipped with a fitting 103 to permit cleanout with compressed air. Apertures 104 in said housing facilitate attachment to the top of block 79.

Each conduit 56 is comprised of coaxially aligned upstream and downstream portions, 106 and 107, respectively. The site of demarcation between said upstream and downstream portions is constriction zone 95. Accordingly, the dough within downstream portion 107 is traveling at a slower linear velocity than the dough in said upstream portion. The ratio of the diameter of the upstream portion to the diameter of the downstream portion is preferably in the range of 0.6 to 0.8.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Apparatus for controlling the flow of dough through multiple parallel conduits of circular cross-section fed by a single manifold, said apparatus comprising:

a) a stem disposed upon the center axis of each conduit and extending between an upstream proximal extremity associated with said manifold, and a downstream distal extremity, b) adjustment means for moving and securing said stem back and forth along said center axis, c) moveable abutment means disposed upon said stem adjacent said distal extremity, and d) stationary abutment means associated with said conduit upstream from said moveable abutment means and interactive therewith to form an annular constriction zone symmetrically disposed about said axis.

2. The apparatus of claim 1 wherein said conduits are vertically disposed, whereby said proximal extremities are upper extremities.

3. The apparatus of claim 2 wherein said moveable abutment means is slidably held upon said stem and biased toward said proximal extremity by spring means interactive between said stem and moveable abutment means.

4. The apparatus of claim 1 wherein said conduits are comprised of a narrow upstream portion and a widened downstream portion which commences at said stationary abutment means.

5. The apparatus of claim 4 wherein the ratio of the diameter of said upstream portion to the diameter of said downstream portion is in the range of 0.6 to 0.8.

6. The apparatus of claim 1 wherein the proximal extremity of said stem is externally threaded.

7. The apparatus of claim 6 wherein said adjustment means is comprised of a rotatable component that threadably engages the proximal extremity of said stem.

8. The apparatus of claim 7 wherein said adjustment means includes a vertical scale of linear measurement, and said stem has affixed thereto a horizontally oriented pointer interactive with said scale of linear measurement.

9. The apparatus of claim 1 wherein said manifold and conduits are component portions of a substantially integral block of engineering grade plastic, and the proximal extremity of said stem protrudes above said block.

\* \* \* \* \*